Oct. 5, 1965 P. J. TAMMINEN 3,210,217
GALVANIC BATTERY
Filed April 24, 1962

PENTTI JUUSE TAMMINEN
INVENTOR.
BY Albert M. Parker
ATTORNEY.

United States Patent Office 3,210,217
Patented Oct. 5, 1965

3,210,217
GALVANIC BATTERY
Pentti Juuse Tamminen, Otakallio, Otaniemi, Finland
Filed Apr. 24, 1962, Ser. No. 189,857
6 Claims. (Cl. 136—132)

This invention relates to electric batteries of either the primary or secondary type, the object of the invention being the provision of a leak proof, easily manufactured single cell battery or a multicell battery stack.

The basic idea of the introduced construction is the use of an elastic sealing material, which in the form of a thin tape is wound under stretch around a preferably cylindrical battery. The tape may be somewhat broader than the height of the battery, so that at the top and at the bottom its edges turn inwards thus securing the battery a compact unit, or it may be as a narrow strip wound just at the places in the battery, where a tight sealing is necessary.

The effective sealing brought about by this method is due to the radial pressure of the insulating film against the borders of the round, solid parts of the battery, which pressure is a result of the stretch. When the stretched film is wound many times around the battery, the resulting pressure is multiplied, and a very tight sealing is achieved. The insulation may be additionally secured by applying adhesive at the borders of respective battery elements and further by providing the tape with thin lines of adhesive so as to tightly secure each layer of tape to a preceding layer at each end of every cell. The outer end of the insulating tape is fastened to the preceding layer, e.g. by glueing or heat sealing.

The leakage of the electrolyte from galvanic batteries, which is a harmful and still a frequent phenomenon in certain battery types, depends normally on gas pressure developed inside the batttery or on perforation of the battery can. The method of the present invention enables a leak proof construction, sealing the electrolyte firmly inside the battery even when the battery can is perforated, and providing an escape for the gas pressure. The gas has a spiral way out from the battery along the surfaces of the adjacent sealing film layers. The gas escape may be facilitated by e.g. talc powder or porous material, such as thin paper, placed between these layers, or by spraying at the outer side of the film paint which makes the surface rough. In batteries containing much moisture it is advisable to place a sheet of absorbent paper between the insulating film layers in order to effectively prevent any leakage.

A suitable sealing material is a very thin plastic film, such as PVC, Teflon, nylon, polyethylene or rubber. In some cases it is advisable to use a combination of two or more different films in order to obtain the desired properties of insulation, gas venting and elasticity. When stretched, the film becomes still thinner, and thus in spite of a safe insulation, the space taken by the insulation material in the battery is amazingly small. Therefore, this method is also well adapted to batteries of miniature size. Another advantage of a thin insulation film is, that it enables the gas to escape partly through the film as well. On the other hand, such sealing prevents effectively the water vapour from escaping, securing a very good shelf life of the battery.

In order to further facilitate the escape of gas pressure from the battery, it is in some cases advisable to provide the insulating film with small holes, which preferably are arranged in longitudinal lines so that e.g. in multicell stacks they fall adjacent to the depolarizer pellets. The distances of the holes in these lines must be so regulated, that the holes of successive film layers do not coincide. In any case it is appropriate to provide both ends of the insulating tape with a few of such holes, because otherwise the gas path may be closed by adhesive or glue.

Furthermore, the insulation tape may be manufactured so that it incorporates small longitudinal grooves. Using such tape the gas venting can be regulated within wide limits.

The accompanying drawing illustrates some applications of the invention:

Figure 1:
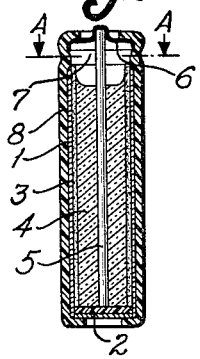
FIG. 1 is a sectional view of a zinc-carbon penlight cell made leak proof by the method of invention.

The battery of FIG. 1 consists of a zinc can 1, provided with a washer 2 which prevents the perforation of the bottom, electrolyte paste 3, depolarizer mix 4 pressed around a carbon rod 5, a metal cap 6, separated from the zinc can by air space 7, and outermost a layer 8 of insulation tape, which is wound several times around the battery, under tangential stretch. According to FIG. 2 the inner end of this tape 9 is bordered with adhesive 10. It may also be fastened to the zinc can, if at all, by heating. A line of holes 11 is adjusted corresponding the air space 7. In a section of this air space shown in FIG. 3, there is carbon rod 12 and insulation tape 14 provided with holes 13. The outer end of the tape is fastened on preceding layer by glue 15. The arrow illustrates one possible path for gas escape from the battery. Because of the radial pressure of the insulation layer, it turns inwards at both ends of the battery, and also a little by the air space. Therefore, it keeps the cap 6 very firmly and tends to press it against the carbon rod.

Figure 4:
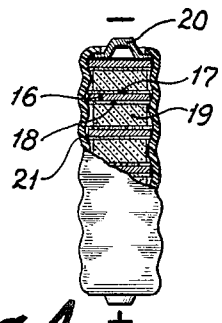
FIG. 4 is a vertical view, partially in section, of an assembled multicell battery embodying the invention.

FIG. 4 shows a very simple and well functioning multicell battery according to the invention. It is stacked of triplex electrodes consisting of round zinc plates 16, covered at one side by carbonaceous, conductive layer 17, at the other side by a separator 18, containing electrolyte paste, depolarizer pellets 19 and terminals 20. The cells are bound together and at the same time insulated by a layer 21, consisting of a tape of thin plastic film, wound several times around the stack under tangential stretch, the outer end of the tape being glued at the preceding tape layer. The additional, described methods for facilitating the gas escape from the battery, preventing the leakage of the electrolyte, or for securing the insulation by means of an adhesive may be used, but are normally not necessary.

Figure 5:
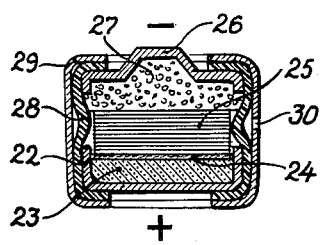
FIG. 5 is a sectional view of a mercuric oxide cell.

FIG. 5 illustrates a HgO-battery consisting of a steel cup 22 filled with depolarizer mix 23, a separator 24, absorbent pellet 25 wetted with electrolyte, and zinc cap 26 pressed together with anode pellet 27 of granulated, amalgamated zinc. These parts are bound together by insulating film 28, which is applied as in previous example. Because the battery contains poisonous material, it is finally provided with steel case 29, preferably with a vent hole 30. Of course, several unit cells stacked on each other may be closed in a common steel case, thus forming a battery of a higher voltage. In order to prevent the stretched insulation tape to penetrate into the soft electrolyte pellet 25, this may be supported by a tubular plastic ring (not shown in the picture).

Figure 6:
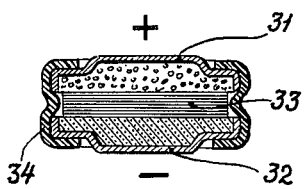
FIG. 6 is a sectional view of a miniature Ni-Cd storage battery.

FIG. 6 shows diagrammatically the construction of a button-type Ni-Cd storage battery, embodying the invention. The positive and negative electrode pellets are pressed in nickel plated steel cups 31 and 32, separated by electrolyte containing porous layer 33. Insulation layer 34 of thin, elastic plastic film is applied according to the previous examples.

Figure 2:
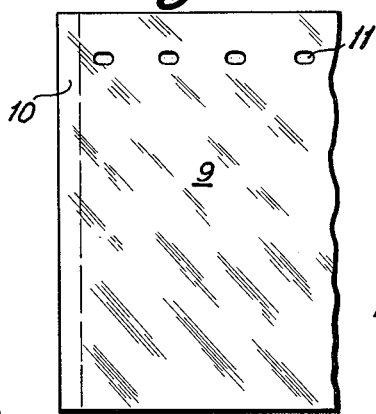
FIG. 2 illustrates a part of the insulation tape used in the cell of FIG. 1.
Figure 3:
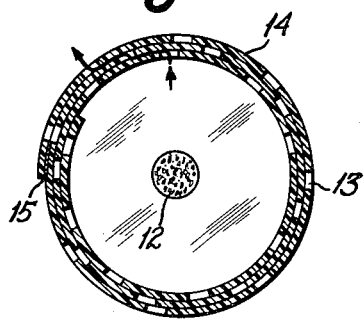
FIG. 3 is an enlarged, schematic plan view in section A—A of the cell shown in FIG. 1.
Figure 7:
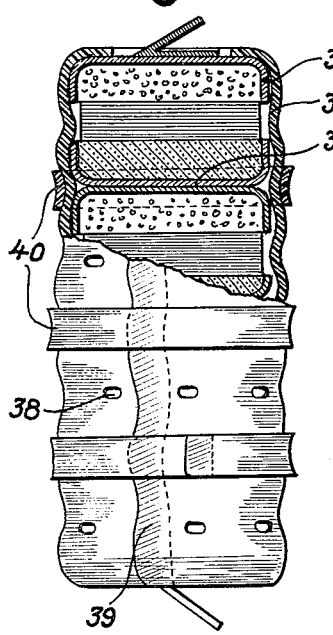
FIG. 7 is a schematic, vertical view, partially in section, of a multicell storage battery.

FIG. 7 illustrates a multicell storage battery, the cells being principally similar as in FIG. 6. The joints 35 between the cells are preferably secured by welding or soldering. The sides of the electrode cups at both ends of the battery are applied with adhesive at 36, so that the insulation layer 37 of a thin, elastic plastic film wound under stretch around the battery stack, as described before, sticks to them firmly. Vent holes 38 are such as shown in FIGURES 2 and 3. The outer end of the insulation tape is fastened on the preceding tape layer by glue 39. In order to improve the intercell insulations additional, narrow insulation tapes 40 are wound, under stretch, at the joints between the cells.

Figure 8:
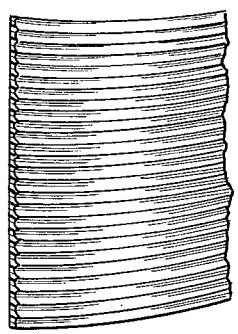
FIG. 8 illustrates a grooved insulation tape.

FIG. 8 illustrates schematically a grooved insulation tape as described before. Said tape has on one face thereof grooves extending in its lengthwise directions.

It is to be understood that the examples shown and described are subject to many variations and modifications within the scope of the present invention.

What I claim is:

1. A galvanic battery comprising rigid battery components and a wrapping of insulating material, said wrapping consisting of a length of thin, extensible plastic tape wound in a plurality of successive laps under lengthwise stretch around said battery and having its outer end secured to a preceding layer of the same, said tape in combination with said rigid battery components effectively sealing said battery against loss of moisture therefrom but being operable under gas pressure to vent gas from said battery along a path between successive laps of said wrapping, and being effective to reseal said battery after venting due to radial pressure of said tape resulting of said lengthwise stretch, said tape being provided with apertures displaced with respect to each other in consecutive layers of said tape.

2. A galvanic battery as in claim 1, said rigid battery components being provided with an adhesive on the portions thereof being in contact with said tape.

3. A galvanic battery as in claim 1, and comprising a continuous layer of thin porous material extending between adjacent layers of said plastic tape.

4. A galvanic battery as in claim 1, said tape having on one face thereof grooves extending in the lengthwise direction of said tape.

5. A galvanic battery as in claim 1, said rigid battery components having a circular cross-sectional shape.

6. A galvanic battery as in claim 1, said tape being somewhat permeable to gas but impermeable to water vapor.

References Cited by the Examiner

UNITED STATES PATENTS

| 912,946 | 2/09 | Eastman | 136—132 |
| 2,595,963 | 5/52 | Lewis et al. | 136—132 |
| 2,671,125 | 3/54 | Heraud | 136—132 |

FOREIGN PATENTS

| 2,687 | 2/15 | Great Britain. |
| 113,469 | 2/18 | Great Britain. |

WINSTON A. DOUGLAS, *Primary Examiner.*

JOHN H. MACK, *Examiner.*